United States Patent [19]

Watkins et al.

[11] Patent Number: 5,530,793
[45] Date of Patent: Jun. 25, 1996

[54] SYSTEM FOR CUSTOM IMPRINTING A VARIETY OF ARTICLES WITH IMAGES OBTAINED FROM A VARIETY OF DIFFERENT SOURCES

[75] Inventors: John B. Watkins, Independance; Jeffrey R. Myers, Kansas City, both of Mo.; John R. Fredlund; Joseph A. Manico, both of Rochester, N.Y.; Anthony R. Berardi, Rush, N.Y.; Michael L. Vandemark, Shawnee, Kans.

[73] Assignee: Eastman Kodak Company, Rochester, N.Y.

[21] Appl. No.: 126,617

[22] Filed: Sep. 24, 1993

[51] Int. Cl.$^6$ ................................................. H04N 7/18
[52] U.S. Cl. ............................................ 395/117; 395/101
[58] Field of Search ..................................... 395/117, 114, 395/115, 110, 101, 111, 147; 358/455

[56] References Cited

U.S. PATENT DOCUMENTS

| | | |
|---|---|---|
| 4,769,694 | 9/1988 | Oshikoshi . |
| 5,042,078 | 8/1991 | Oshikoshi et al. . |
| 5,045,967 | 9/1991 | Igarshi ................................. 395/131 |
| 5,088,050 | 2/1992 | Ito ........................................ 395/142 |
| 5,140,674 | 8/1992 | Anderson et al. .................... 395/111 |
| 5,146,548 | 9/1992 | Bijnagte ............................... 395/117 |
| 5,274,751 | 12/1993 | Rosenberg .......................... 395/117 |
| 5,291,561 | 3/1994 | Tanaka et al. ....................... 382/113 |

FOREIGN PATENT DOCUMENTS

| | | |
|---|---|---|
| 2180427 | 3/1987 | United Kingdom . |
| 2242592 | 1/1991 | United Kingdom . |
| 90/00336 | 1/1990 | WIPO . |
| 90/10251 | 9/1990 | WIPO . |
| 93/17517 | 9/1993 | WIPO . |

OTHER PUBLICATIONS

Tos Magazin Plus Solftware for Den Atari ST & TT, No. 9, Sep. 1991, Vaterstetten, Germany, pp. 107–113, W. Klemme 'Werkzeuge Fur Profits'.

"The Birthday Times" Brochure, 1988, Hallmark Cards, Inc.

"The Computer Poet" Brochure, Oct. 1984, The Computer Poet Corporation.

"The Computer as an Artistic Tool", *Byte*, Sep. 1984, pp. 189–206.

"The Print Shop Reference Manual", 1986, Broderbund Software.

*Primary Examiner*—Mark R. Powell
*Assistant Examiner*—Steven P. Sax
*Attorney, Agent, or Firm*—Frank Pincelli

[57] ABSTRACT

A system and method for combining a first digital generated image and one or more prestored digital images. The system include means for selecting one of the prestored digital images for and the steps of selecting an output format for printing the first digital generated image and the selected prestored image, providing the first digital generated image, combining the first digital generated image with the selected prestored digital image such that the generated image is placed in the predetermined location so as to form a merged image in accordance with the requirements of the selected output format, and for printing out the merged image in a desired format.

16 Claims, 4 Drawing Sheets

SYSTEM FOR CUSTOM IMPRINTING A VARIETY OF ARTICLES WITH IMAGES OBTAINED FROM A VARIETY OF DIFFERENT SOURCES

FIELD OF THE INVENTION

A system and method are disclosed for producing customized images by merging at least two images obtained from different sources and imprinting the merged image on at least one output format from a plurality of output forms that are available. This application is related to and continues subject matter disclosed in prior copending Buckley et al, U.S. patent application Ser. No. 07/602,439, filed Oct. 22, 1990, which was related to and continued prior copending Buckley et al, U.S. patent application Ser. No. 07/282,013 which issued as U.S. Pat. No. 5,036,472 on Jul. 30, 1991, and Banks et al, U.S. patent application Ser. No. 07/514,670, filed Apr. 25, 1990. This application is also related to and continues subject matter disclosed in prior copending Buckley et al, U.S. patent application Ser. No. 07/876,389, filed Apr. 30, 1992, which was a divisional application of prior copending Buckley et al, U.S. patent application Ser. No. 07/735,985, filed Jul. 25, 1991, which was a division of prior U.S. patent application Ser. No. 07/282,013 which issued as U.S. Pat. No. 5,036,472 on Jul. 30, 1991. The disclosures of said applications Ser. Nos. 07/282,013, 07/514,670, 07/602,439, 07/735,985 and 07/876,389 are incorporated herein by reference.

BACKGROUND OF THE INVENTION

Applicants' related application Ser. No. 07/282,013, now U.S. Pat. No. 5,036,472, discloses examples of personalized greeting cards and the production of those cards. Designs have also been imprinted on various other articles such as hats, notebook covers, signs, bumper stickers, umbrellas, cloth, or canvas items, cups, coffee mugs, certificates, key chains, balloons, buttons, business cards, and other custom designed items. For instance, U.S. Pat. No. 4,873,643 discloses the imprinting of designs by a customer using an apparatus which has a central processing unit (computer) programmed with design rules that restrict the placement and size of certain print design elements to assist the customer in providing the customized imprinted articles.

In addition, EP Application No. 0 326 515 has addressed imprinting, or transferring of a complex image which has been obtained from the merging of a video/photo image into a decorative background and printing the complex image onto an ordinary blank card.

A problem sometimes associated with previously available systems is that they have been limited either by the number of output formats, or in the type of input that may be provided, or in artifacts resulting from the merger of image data. While the GB 2,246,929-A and EP 0 326 515 publications disclose the use of digital photographic images with other prestored images, there is no adjustment provided with regard to the quality of the image being presented with that of the prestored or created images. Thus, there is an inherent problem in providing a high-quality, professional-looking image onto the desired format. Further, the previous systems generally fail to take into consideration that when different output formats are provided for imprinting of the design, for example, onto cups, T-shirts, paper and other various formats, there is no consideration given as to the manner in which the initial information is obtained and manipulated by the apparatus. Typically, devices are configured so as to use a single type input device, such as film scanner, print scanner, video camera, computer generated graphic, etc., and a single type output device, such as a thermal printer, CRT printer, ink jet printer, etc. Image data files compiled by these different input and output devices are very different from each other. In order to combine image data files from different sources and print the desired image on the desired output format from a variety of available formats, would require the manipulation and combination of the image data files properly in order to obtain a high quality image. Additionally, known prior art systems have failed to incorporate an effective manner in which a single subject/object may be easily isolated from the background and combined into prestored images.

The Applicants have invented a system which is capable of easily producing a customized image obtained by combining a variety of different images from different sources onto at least one of a variety of different output formats wherein the image provided on the output format is of high quality in a professional format. The system also automates and coordinates the required operations in order to reduce the skill level of the operator while maintaining the versatility and high quality of the system. The present invention also minimizes any storage and computational needs required for the imprinting of the image onto any particular format. Additionally the present invention provides an easy and economical method for the isolation of a single subject or object which can then be easily combined with an other image.

SUMMARY OF THE INVENTION

In one aspect of the present invention there is provided a method of combining a first digital generated image and one or more prestored digital images, comprising the steps of:
a) selecting one of said prestored digital images, each of the prestored digital images having at least one predetermined location where the first digital generated image may be placed;
b) selecting an output format for printing, displaying, transmitting, or storing the first digital generated image and the selected prestored image;
c) providing the first digital generated image; and
d) combining the first digital generated image with the selected prestored digital image such that the generated image is placed in the predetermined location so as to form a merged image in accordance with the requirements of the selected output format.

In another aspect of the present invention there is provided a method of combining a first digital generated image and/or text and one or more prestored digital images, comprising the steps of:
a) selecting one of said prestored digital images, each of the plurality of prestored digital images having at least one predetermined location where the generated image and/or text may be placed;
b) selecting an output format for printing, displaying, transmitting, or storing the first digital generated image and the selected prestored image;
c) providing said first generated image by scanning an existing image in accordance with the requirements of the preselected output format; and
d) combining the first generated image and/or text with the selected prestored digital image at the predetermined location so as to form a merged image.

In yet another aspect of the present invention there is provided a method of combining at least one generated image and one or more prestored digital images, comprising the steps of:

a) selecting one of said prestored digital images, each of the prestored digital images having one or more predetermined locations where said first digital generated images and/or text may be placed;

b) providing a plurality of different capture means for obtaining at least one customer generated image in digital form;

c) providing a plurality of different output means for printing of an image;

d) selecting a desired output format upon which an image may be provided;

e) modifying the selected prestored digital image so as to form a first modified image; and f) combining the first modified image and the first digital generated image, the first digital generated image being located at the predetermined location so as to form a merged image.

In yet still another aspect of the present invention there is provided a method of combining a first digital generated image and one or more selected prestored digital images, comprising the steps of:

a) selecting one of said prestored digital images, each of the prestored digital images having at least one predetermined location wherein the customer generated image may be placed;

b) providing the first digital generated image;

c) adjusting the first digital generated image in accordance with at least one predetermined relationship with respect to the selected prestored image; and d) combining said first digital generated image with said selected prestored digital image such that said generated image is placed in said predetermined location so as to form a merged image.

In another aspect of the present invention there is provided a method of combining a first digital generated image and one or more prestored digital image, comprising the steps of:

a) selecting one of said prestored digital images, each of the prestored digital images having at least one predetermined location wherein the customer generated image may be placed;

b) providing the first digital generated image; and c) combining the first digital generated image with the selected prestored digital image such that the generated image is placed in the predetermined location so as to form a merged image.

In another aspect of the present invention there is provided a system for combining a first digital generated image and one or more prestored digital images, comprising:

a) means for selecting one of said prestored digital images, each of said prestored digital images having at least one predetermined location wherein said first digital generated image may be placed;

b) means for selecting an output format for printing said first digital generated image and said selected prestored image;

c) means for providing said first digital generated image; and d) means for combining said first digital generated image with said selected prestored digital image such that said generated image is placed in said predetermined location so as to form a merged image in accordance with the requirements of the selected output format.

In still another aspect of the present invention there is provided a system for combining a first digital generated image and/or text and one or more selected prestored digital images, comprising:

a) means for selecting one of said prestored digital images, each of said plurality of prestored digital images having at least one predetermined location where said generated image and/or text may be placed;

b) means for selecting an output format for printing said first digital generated image and said selected prestored image;

c) means for providing at least one generated image by scanning an existing image in accordance with the requirements of the preselected output format; and d) means for combining said at least one generated image and/or text with said selected prestored digital image at said predetermined location so as to form a merged image.

In another aspect of the invention there is provided a system for combining a first generated image and one or more selected prestored digital images, comprising:

a) means for selecting one of said prestored digital images, each of said prestored digital images having one or more predetermined locations where said first digital generated image may be placed;

b) means for providing a plurality of different capture means for obtaining said first generated image in digital form;

c) means for providing a plurality of different output means for printing, displaying, transmitting, or storing of an image;

d) means for selecting a desired output format upon which an image may be provided;

e) means for modifying said selected prestored digital image so as to form a first modified image;

f) means for combining the first modified image and said first digital generated image, said first digital generated image being located at said predetermined location so as to form a merged image; and g) means for printing, displaying, transmitting, or storing a said merged image in a preselected format.

In a further aspect of the present invention there is provided a system for combining a first digital generated digital image and one or more selected prestored digital images, comprising:

a) means for selecting one of said prestored digital images, each of said prestored digital images having at least one predetermined location wherein said customer generated image may be placed;

b) means for providing said first digital generated image;

c) means for adjusting said first digital generated image or said selected prestored image with respect to the other in accordance with at least one relationship; and d) means for combining said first digital generated image with said selected prestored digital image such that said generated image is placed in said predetermined location so as to form a merged image.

In another aspect of the present invention there is provided a system for combining a first digital generated digital image and one or more prestored digital images, comprising:

a) means for selecting one of said prestored digital images, each of said prestored digital images having at least one predetermined location wherein said customer generated image may be placed;

b) means for providing said first digital generated image;

c) means for combining said first digital generated image with said selected prestored digital image such that said generated image is placed in said predetermined location so as to form a merged image; and d) adjusting the merged image for different output formats.

In yet another aspect of the present invention there is provided a method for obtaining a digital generated image of a subject or object using a electronic camera, comprising the steps of:

a) placing the subject or object in front of a lighted background having a higher illumination than the subject such that the background is driven to saturation in all colored channels such that the object is easily separated from the background; and b) using the electronic camera to capture the image of the subject or object.

DESCRIPTION OF THE DRAWING

In the detailed description of the preferred embodiment of the invention as presented below, reference is made to the accompanying drawings, in which.

DETAILED DESCRIPTION

Figure 1:
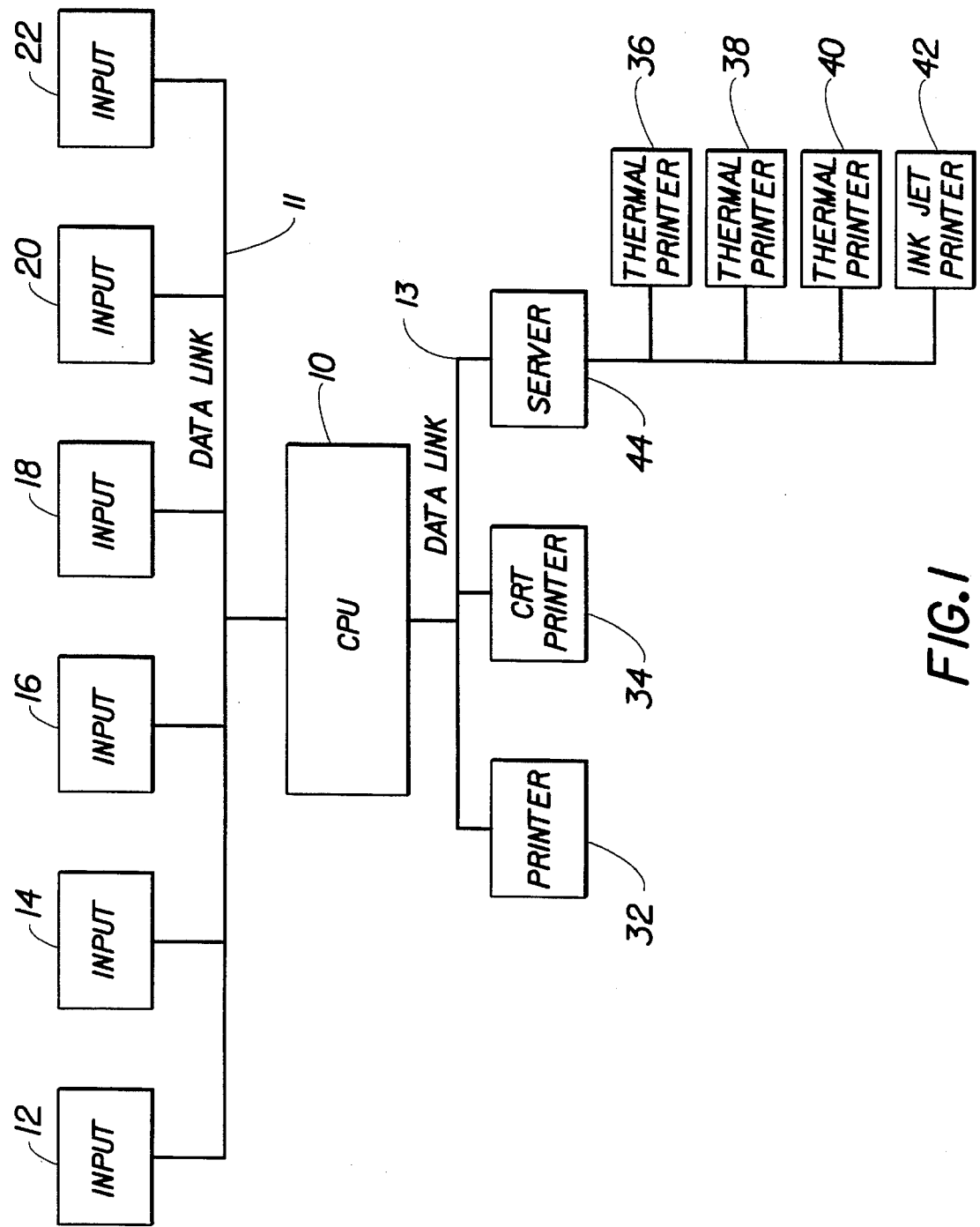
FIG. 1 is a schematic block diagram of a system made in accordance with the present invention.

Referring to FIG. 1, there is illustrated in block diagram form, a system for producing customized images and imprinting these customized images onto a variety of different formats. In particular, the system includes a central processing unit (CPU) 10 which can take the form of any appropriate computer. In the particular embodiment illustrated, the central processing unit 10 comprises an Apple Macintosh Computer which is used to control the various input and output devices. A plurality of input devices 12,14, 16,18,20,22 are provided for generating a image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output which is forwarded onto the central processing unit 10 by an appropriate data link system 11 for further manipulation. Likewise, input device 14 is provided for scanning of photographic pictures, printed or drawn, both color and/or monochrome, and producing a digitized signal which is representing the image scanned. The Coloredge Printer, sold by the Eastman Kodak Company, has a scanner built therein which is capable of scanning photographic pictures, or any type printed material, and providing the appropriate digital signal for the computer 10. The second input device 14 is appropriately connected to the CPU 10 such that the CPU 10 may appropriately receive and manipulate the information obtained therefrom. Likewise, input devices 16,18,20,22 are provided for obtaining digital signals representative of an image from various sources. In particular, input device 16 is a video camera designed to obtain images, and input device 18 comprises a CD (compact disc) reader for reading digitally stored information on a compact disc. Input device 20 comprises a electronic camera such as the DCS 200 Digital Camera, produced by the Eastman Kodak Company. Input device 22 may be any other input device which is capable of providing a digital signal representative of an image to the CPU, for example, video tape, video laser disc.

The CPU 10 is also connected to a variety of output devices 32,34,36,38,40,42. These output devices are all appropriately connected to the central processing unit 10 by an appropriate data link system 13 as is well known in the prior art. For example, but not by way of limitation, by an Ethernet data link system. The output device 32 for instance comprises a electrophotographic printer such as the Coloredge Printer, sold by the Eastman Kodak Company, which takes the digital image and transfers the image onto media which can then be used to produce transfers for use on garments. The output device 34 in the embodiment illustrated is a cathode-ray tube Printer (CRT), in particular, the PCD 600 Printer, produced by the Eastman Kodak Company, which takes an image that is displayed on a Cathode-ray tube and focuses it onto a photographic paper. Also provided is a thermal printer 36 for printing images onto thermal media. An example of a suitable thermal printer is the XLT 7720 Digital Thermal Color Printer, sold by the Eastman Kodak Company. In particular, printer 38 can be a thermal printer for providing transfers for use on T-shirts, whereas thermal printer 40 can be used for providing transfers for placement on mugs. The last output device 42 illustrated is an ink jet printer which can be used to imprint the merged image on greeting cards and the like. Various other devices may be provided for transferring onto various other formats such as, garments, mugs, posters, banners, life size cut outs, holographic and 3-D imaging, balloons, pens and pencils.

In the preferred embodiment illustrated, a server 44, such as the Centrix 650 Apple Macintosh Computer, for managing information from the CPU 10 and for appropriately providing information to the various printing devices associated therewith. Likewise, if so desired, additional computers may be provided in association with each of the input or output devices for managing information and providing further customizing features as deemed appropriate. For a more simplified system, the input and output devices may all be connected to a single computer. Also it is to be understood that any type suitable printing device may be employed for producing the image in the desired format, the present invention not being limited by the printing devices described herein.

Is to be understood that the CPU 10 may be provided with a monitor for viewing various screen for indication the status of the system and available options for controlling and/or operating the system as is customarily done in the prior art. The CPU is also provided with an appropriate input device such as a keyboard, touchscreen or pointing device as are well known in the prior art for allowing the operator to properly operate the system. Thus the user, which may be the operator and/or customer, can also view the various images being input into the system and generated by the system so that the appropriate selections can be made by the user and/or customer.

Figure 2:
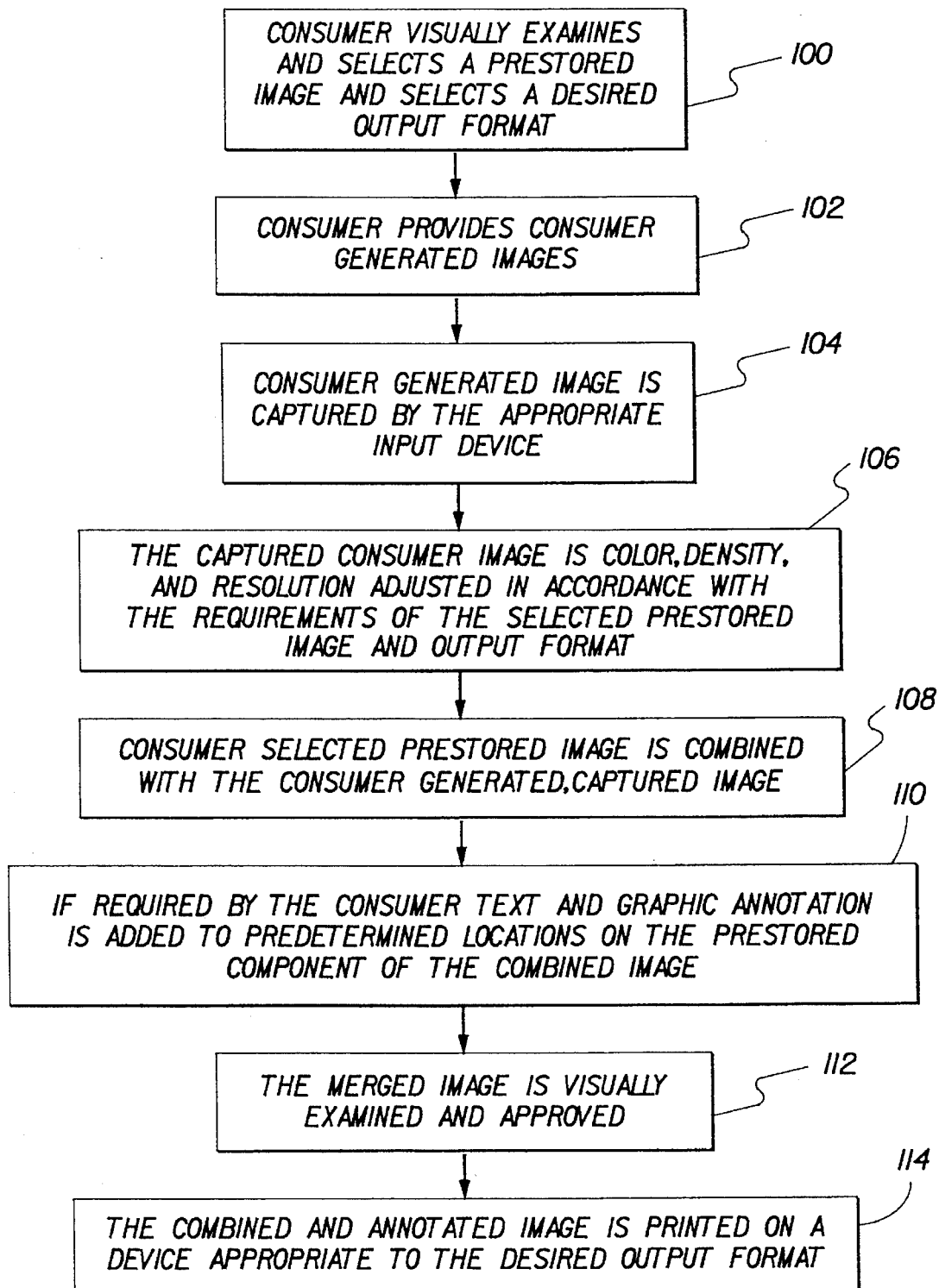
FIG. 2 illustrates a block diagram of the operation of the system of FIG. 1.

Referring to FIG. 2, there is illustrated a flow diagram of an example of how the system of FIG. 1 may be operated.

In particular, as is indicated by the box 100, a customer and/or operator will visually examine, through the use of the video screen connected to the CPU 10, a plurality of prestored images provided in the memory of the CPU 10. Optionally the user may view hard copy representations of the images prestored in the CPU 10. In order to more fully utilize the storage capacity of the memory, the data stored in memory may be compressed. The user will select one of the prestored images which will be combined with one or more consumer-generated images that are provided.

The CPU is preferably programmed so that the customer/operator may view any of the images on the monitor that have been captured or generated by the CPU 10 so that the desired selections and modifications can be made and viewed at any time.

The customer/operator, at decision point 100, also selects the desired output format, for example, if the image is to be placed on a a T-shirt, paper, greeting card, photographic paper, or other desired format available. In certain situations, the prestored image selected may not be allowed to be printed in a particular format due to its unsuitability for that particular format; for example, if the selected prestored image does not have the proper resolution for the format selected. In the embodiment illustrated the computer has been programmed to take into consideration the capabilities of the output format selected and the requirements of the prestored image and make the necessary adjustments, for example color and pixel density.

The customer then reaches the next step illustrated by box 102 wherein the customer provides one or more images as required by the selected prestored image, which are to be combined and merged into the selected prestored image. For example, the customer may provide one or more photographs which will be scanned by input device 14 which produces a digital signal which is supplied to the CPU 10. Box 104 illustrates the capturing of the image as is accomplished by input device 14. However, the customer-generated image may be captured by any of the other input devices previously described or any other desired suitable device.

The generated image which has been captured and sent to the CPU 10 is then automatically adjusted, by preprogrammed instructions provided in the CPU 10, in form and quality in accordance with the requirements of the selected prestored image and the selected output formats. In particular, as illustrated by box 106, the captured image may be color balanced, and density, contrast saturation and resolution adjusted, so that the image, when merged into the prestored image, will be properly matched with respect to the selected prestored image so as to provide a uniform and high quality merged image.

An example where adjustment is required is illustrated when the customer/operator selects an output device, such as a thermal printer, having capabilities of printing at 200 pixels per inch for printing a 10 inch×10 inch active image area and a 4 inch×4 inch photo is scanned for placement into the selected prestored image. The resolution of the customer generated image must be adjusted to match the selected prestored image. This can be accomplished by either scanning at the correct pixel density or by using the computer to interpolate the information so as to provide the correct match. The prestored images can also be stored at different resolutions so that matching with the output format or scanned image can be more easily accomplished.

In a similar fashion, if the customer-generated image has a low contrast with respect to the selected prestored image due to the scanned negative or photograph being underexposed, the generated image can be digitally adjusted to match the selected prestored image. As previously noted, the customer and/or operator may view the captured or merged image at any time. Thus, the customer generated image can be adjusted or corrected as desired in accordance with the capabilities of the computer software at the appropriate time in process. For example, sizing and cropping of the image, changing the color of a item in the image such as hair or eye color, fixing of imperfections in the original image such as streaks, lines, spots or red eye may be digitally adjusted or corrected at this time. Also, the customer generated image may be modified to achieve a desired artistic effect. For example, the customer generated image may be modified to look like a water colored painting, a poster, line sketch, or otherwise modified as limited by the selections available. Additionally, the information generated by the input device and sent to the CPU 10 is properly managed in accordance with the output format. For example, if the output is to be a 11×14 color print produced by output device 32, the obtaining of the digital information by any of the input devices will be adjusted so as to obtain the appropriate and desired information required for producing the quality-type image. However, in situations where the quality of the image initially generated by the input device is not critical, a condition which might occur where an image is to be placed on a mug, the input devices will be adjusted to obtain the desired appropriate information without obtaining or manipulating more data than is necessary. Thus, this minimizes the need or requirement of obtaining information greater than required which adds to the computational requirements of the CPU 10 and storage requirements of memory in order to provide the appropriate merged image.

In addition to being able to adjust the customer generated image to the selected prestored image, the prestored image can also be modified to match or otherwise be related to the customer generated image. For example, certain objects in the prestored image can be color matched with respect to the color objects or subjects in the generated image, such as the color of the border, objects or background in the prestored image may be color matched to the color of an individual's hair, article of clothing or other objects in the generated image. Additionally, patterns or textures may be taken from the customer-generated image or the prestored image and may be incorporated into the other.

Once the customer generated image or images have been properly adjusted, it is combined with the selected prestored image as is represented by box 108. The customer and/or operator may then view the merged image for making any further corrections or adjustments so desired. Since the stored image and the captured image are both in digital format, the combination of the two images can be obtained relatively quickly and easily.

Figure 3:
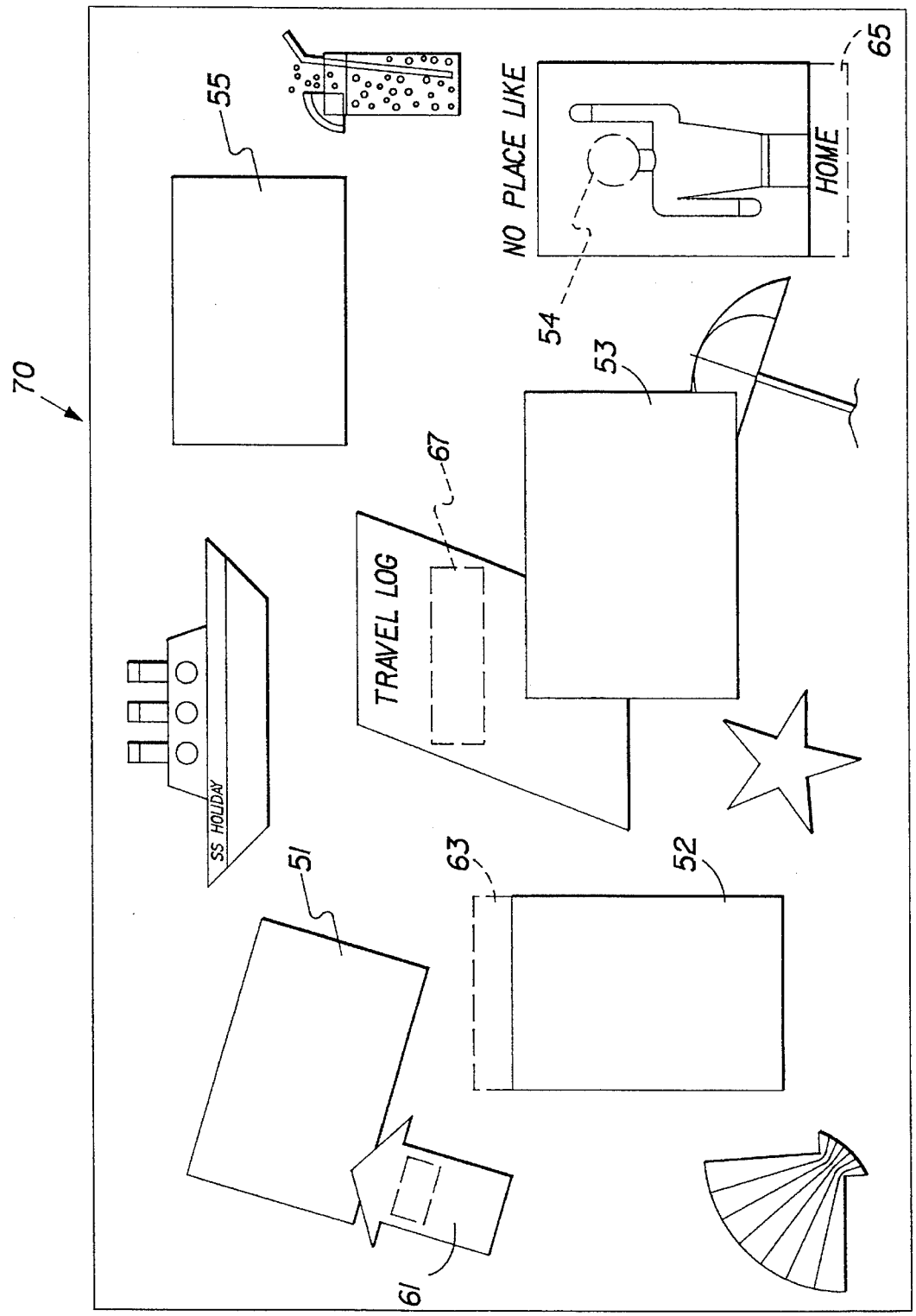
FIG. 3 illustrates an example of a prestored image having several location for receiving a customer generated image.

The CPU 10 may also provide the user with the ability to add additional graphics/images and/or text to predetermined locations on the prestored image as illustrated by step 110. As illustrated by FIG. 3, a prestored image 70 is shown prior to it being combined with the customer-generated image. As can be seen, the prestored image 70 has five (5) locations, indicated by numerals 51,52,53,54,55 wherein customer-generated images, portions of customer-generated images or other stored images can be place. Any desired number of locations may be provide and may vary in accordance with the selection of the prestored image.

In addition, in the selected prestored image, there are additional locations, indicated by numerals 61,63,65,67 where additional personalized information such as a name, place or date may be placed. As can be seen from the prestored image as illustrated in FIG. 3, the theme is that of a vacation. However any other desired theme may be employed, for example, any sports activity, any location or artistic theme.

Figure 4:
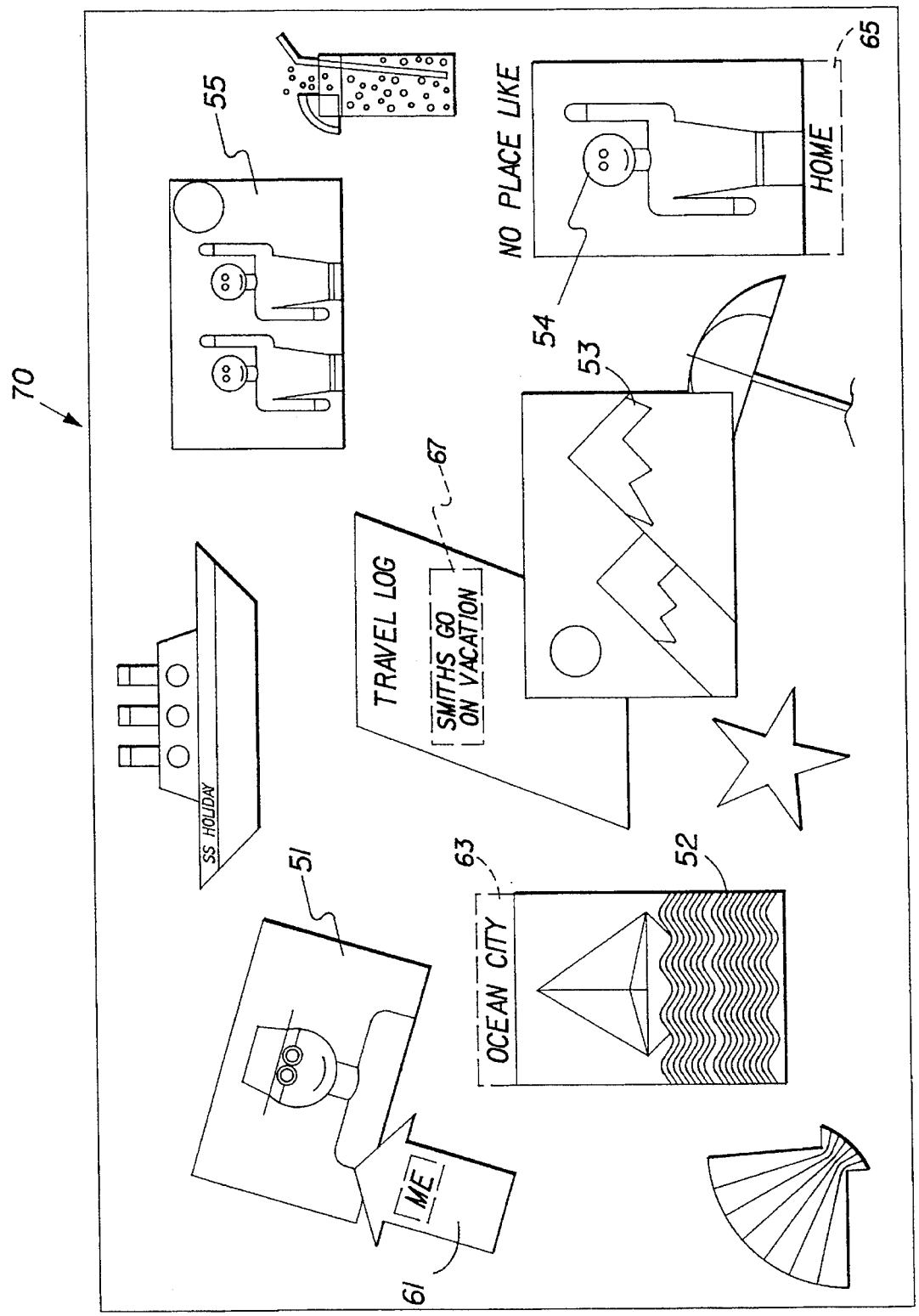
FIG. 4 is an illustration of the prestored image of FIG. 3 merged with customer generated images imprinted onto a photographic paper using the system of FIG. 1.

Referring to FIG. 4, there is illustrated a merged image formed by the combining of the consumer-generated images and text with the prestored image of FIG. 3 that has been imprinted on a desired format. At location 54 only a portion of a consumer-generated image is required. In this particular instance, the head of a person. In the particular embodiment illustrated the output format is a photographic picture. However, this same merged image may be placed on any desired format. As represented by box 112, the merged image may be viewed on the monitor whereby the customer and/or operator will inspect and approve the merged image. If no further adjustments are desired or required, the merged image is sent to the appropriate output format as illustrated by box 114.

It is, of course, to be understood that the merged image may be produced in more than one format as desired by the consumer. As seen in FIG. 4, personalized information has been provided at locations 61–67. The providing of discrete location wherein the user's generated image may be simply placed allows for quick and easy combining of images while at the same time providing a high quality professional looking end product.

Also understood is that various other prestored images may be provided with equal versatility. For example, a prestored image may include a setting wherein store names, bottle labels, or product names may be personalized by the user to contain desired images or data.

The selected prestored image, in the embodiment illustrated, is provided with specific locations which are designed to incorporate generated images. As previously noted, any desired number of locations may be provided. Additional prestored images may be placed at one or all of these locations so that limitless combinations of images may be generated by the customer and/or operator.

As previously discussed, input device 20 conprises a DCS camera for taking on-the-spot images. In certain instances existing backgrounds may be provided behind the subject to be captured. It may also be desired that only the subject/object be captured without any background so that the subject or object can then be placed on a desired prestored background. This can be easily accomplished by placing the subject in front of a lighted background having a higher illumination than the subject, such that the background is driven to saturation in all color channels of the digital still camera. The subject or object is then easily separated from the background. For editing the complete subject or object, the subject or object is placed on an illumination box, then the entire subject or object can be isolated.

The present invention is not limited to the output devices described herein. Any type output device may be employed for producing the image in the desired format, for the transmission of the merged image to another device at a different location, for display of the merged image (such as a video display screen) or for the permanent storage of the digital information on other formats such as a CD, or magnetic disc or tape. Storage of the merged image of course allows for the personal viewing or making of additional prints of the stored image at some later date.

Thus, there is provided a system which is capable of easily producing a customized image obtained by combining a variety of different images from different sources onto at least one of a variety of different output formats wherein the image provided on the output format is of high quality and in a professional format. The present invention also minimizes any storage and computational needs required for the imprinting of the image onto any particular format. Additionally the present invention provides an easy and economical method for the isolation of a single subject or object which can then be easily combined with another image.

It should be clear from the above disclosure to one skilled in the art that the method and system of the invention may be incorporated into a point of sale interactive machine which is wholly or partially operated by the customer. More particularly, it should be clear that the above-described method and system may be incorporated into a point of said vending machine which is wholly operated by a customer without operator intervention as described in the related applications referred to above.

The output devices may also include means for incorporating sound record and/or emitting devices such as currently in talking greeting cards or photographs as currently available in the market. In such case, the digital sound may be provided to the CPU 10 and then incorporated in the output formats.

It is to be understood that various changes and modifications may be made without departing from the scope of the present invention, the present invention being limited by the following claims. For example, but not by way of limitation, the output formats may be selected, for example labels for wine bottles and other products.

Parts List
10 . . . central processing unit
11,13 . . . data link system
12,14,16,18,20,22 . . . input devices
32,34,36,38,40,42 . . . output devices
44 . . . server
51,52,53,54,55,61,63,65,67 . . . prestored image locations
70 . . . prestored image
100,102,104,106 . . . boxes
100 . . . decision point
110 . . . step
112 . . . box

We claim:

1. A method of combining at least one first captured generated digital image and/or text and one or more second prestored digital images, comprising the steps of:

a) selecting one of said second prestored digital images, each of said second prestored digital images having one or more predetermined locations where captured generated digital images and/or text may be placed;

b) providing a plurality of different capture means for obtaining at least one customer generated image in digital form;

c) providing a plurality of different output means for printing, displaying, transmitting, or storing of an image;

d) selecting a desired output format upon which an image may be provided;

e) modifying said first captured generated digital image or second selected prestored digital image so as to form a first modified image; and f) combining the first modified image and said first captured generated digital image or said second prestored digital image, said first captured generated digital image or said modified image being located at said predetermined location so as to form a newly merged digital image in accordance with the requirements of the selected output format, wherein both images that are combined are permanently modified.

2. A method according to claim 1 further comprising the step of printing said merged image in said selected output format.

3. A method according to claim 1 further comprising the step of displaying or storing said merged image.

4. A method according to claim 1 further comprising the step of transmitting said merged image to an output device at a remote location.

5. A method according to claim 1 wherein said output format is selected from the group consisting of: a greeting card, a post card, a photograph, a mug, a garment, wine label or other label.

6. A method according to claim 1 wherein said first digital generated image is obtained by scanning an existing image in accordance with the requirements of said output format.

7. A method according to claim 1 wherein said first digital generated image is adjusted with respect to the selected prestored digital image.

8. A method according to claim 7 wherein said first digital generated image is adjusted for at least one of the following characteristics: resolution, color balance, contrast, saturation and density.

9. A method according to claim 7 wherein said first digital generated image comprises an image and/or text.

10. A method according to claim 7 wherein said first digital generated image is obtained by placing a subject in front of a lighted background having a higher illumination than the subject such that the background is driven to saturation in all colored channels such that the object is easily separated from the background.

11. A method according to claim 10 wherein said first digital generated image is superimposed on said selected, prestored digital image.

12. A method according to claim 7 wherein said step of selecting one of said prestored digital images is accomplished by visually reviewing said prestored digital images.

13. A system for combining at least one first captured generated digital image and/or text and one or more second prestored digital images, comprising:

a) means for selecting one of said second prestored digital images, each of said second prestored digital images having one or more predetermined locations where first captured generated digital images and/or text may be placed;

b) means for providing a plurality of different capture means for obtaining at least one customer generated image in digital form;

c) means for providing a plurality of different output means for printing, displaying, transmitting, or storing of an image;

d) means for selecting a desired output format upon which an image may be provided;

e) means for modifying said first captured generated digital image or second selected prestored digital image so as to form a first modified image; and f) means for combining the first modified image and first captured generated digital image or said second prestored digital image, said first captured generated digital image or said modified first image being located at said predetermined location so as to form a newly merged digital image in accordance with the requirements of the selected output format, wherein both images that are combined are permanently modified.

14. A system according to claim 13 further comprising means for printing, displaying, transmitting or storing said merged image.

15. A method according to claim 1, wherein first captured generated digital image or second selected prestored digital image is modified with respect to the other in accordance with at least one relationship.

16. A method according to claim 1, further comprising the step of providing at least one generated image by scanning an existing image in accordance with the requirements of the preselected output format.

* * * * *